United States Patent Office 3,801,545
Patented Apr. 2, 1974

3,801,545
SOLUBLE AROMATIC POLYAMIDES AND FILA-
MENTS WITH A HIGH MODULUS OF ELASTIC-
ITY PRODUCED FROM THEM
Hans Egon Kunzel, Dormagen, Gunter Blankenstein, Stommeln, Francis Bentz, Cologne, and Gunther Nischk, Dormagen, Germany, assignors to Bayer Aktiengesellschaft, Leverkusen, Germany
No Drawing. Filed Sept. 1, 1972, Ser. No. 285,578
Claims priority, application Germany, Sept. 3, 1971,
P 21 44 126.9
Int. Cl. C08g 20/20
U.S. Cl. 260—47 CZ    3 Claims

ABSTRACT OF THE DISCLOSURE

The invention relates to high molecular weight aromatic polyamides with a relative solution viscosity $\eta_{rel}$ measured in a 0.5% solution in N-methylpyrrolidone at 25° C. of between 1.7 and 3.2, consisting of recurrent structural units of the general formula

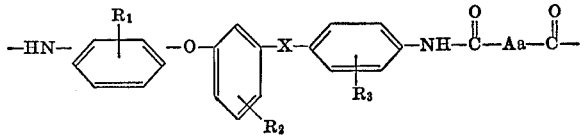

in which X, $R_1$, $R_2$, $R_3$ and Ar have the meaning as defined in the specification of the application.

---

This invention relates to new aromatic polyamdies which are soluble in polar organic solvents and to filaments with a very high modulus of elasticity (initial modulus) produced from them.

It is known to produce aromatic polyamides from diaminobenzanilides, e.g. 3,3'- or 4,4'-diaminobenzanilides, and aromatic dicarboxylic acid halides such as iso- or terephthalic acid dichloride by solution polycondensation or interfacial polycondensation (Pol. Letters 4 (1966) 1033–1038 and Belgian Pat. No. 651,149). These polyamides, which are usually only soluble in polar organic solvents if the solvents contain inorganic salts (LiCl) as solubilizing agents, can be spun into filaments with very high tensile strengths. However, the modulus of elasticity of these filaments is very low compared with that of glass fibres.

It is also known that polycondensates with a very high modulus of elasticity, which sometimes even exceeds that of glass fibres, can be produced from p-aminobenzoyl chloride hydrochloride (DOS No. 1,924,736) and from p-aminobenzhydrazide and terephthalic acid dichloride (DOS No. 1,938,282). Fibres produced from these polycondensates have the advantage over glass fibres of having a lower density. Hence the specific modulus of elasticity of these fibres is therefore substantially higher than that of glass fibres. The disadvantage of these polycondensates, however, is the low solubility of the products. To prepare solutions in polar organic solvents, it is necessary to add considerable quantities of inorganic salts, (LiCl) to these solvents and the salts must subsequently be removed from the filaments by time consuming aftertreatments because they are liable to have a deleterious influence on the stability of the polycondensates at elevated temperatures. Another disadvantage of these polycondensates is that the intrinsic viscosity of the products must be very high if fibres with a very high modulus of elasticity are to be obtained. According to DOS No. 1,938,282, the intrinsic viscosity must be at least 3.5. Owing to their high viscosity, the products can only be worked up from relatively dilute solutions (5 to 10% solutions). It is therefore necessary to deal with relatively large quantities of solvents. In the examples given in DOS No. 1,924,736, the solutions used are without exception of relatively low concentrations (8 to 10.8%).

Previous experience in the production of aromatic polycondensates has shown that high moduli of elasticity can only be obtained if all the aromatic nuclei in the chain of the polycondensate are para-orientated or if, in the case of condensed or heterocyclic ring systems, they have an orientation which comes close to the para-orientation of the phenyl nucleus.

Introduction of meta-orientated phenyl nuclei invariably resulted in a lowering in the modulus of elasticity compared with that of purely para-orientated condensates. This led to the conclusion that "generally para-orientated aromatic groups invariably result in a higher modulus than meta-orientated groups" [W. de Winter, Textile-Industrie 72 (1970) page 834].

It has now surprisingly been found that polyamides which contain recurrent structural units of the following General Formula I

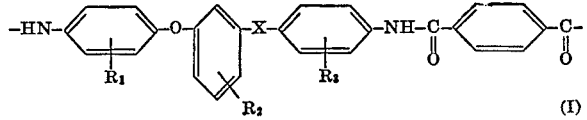

wherein $R_1$, $R_2$, $R_3$, Ar and X have the meanings as indicated below, also result in products with a very high tensile strength and very high modulus of elasticity although one of the four phenylene groups of the basic unit is meta-orientated whereas corresponding polyamides in which all the four phenylene groups are para-orientated are substantially inferior both in their tensile strength and in their modulus of elasticity than the products of Formula I in spite of the fact that the viscosity of the completely para-orientated polyamides is much higher than that of the corresponding products of Formula I.

Filaments obtained from products of Formula I were found to have tensile strengths of 5 to 10 g./dtex. and moduli of elasticity of between 4000 and 10,000 kg./mm.$^2$.

This invention therefore relates to high molecular weight aromatic polyamides with a relative solution viscosity $\eta_{rel}$ measured in a 0.5% solution in N-methylpyrrolidone at 25° C. of between 1.7 and 3.2, consisting of recurrent structural units of the general formula

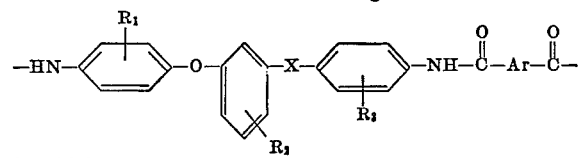

in which
X represents the group

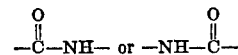

$R_1$ and $R_2$ represent, independently of each other, hydrogen, alkoxy or alkyl groups with 1 to 4 carbon atoms or halogen atoms,
$R_3$ represents hydrogen, halogen ,an alkyl or alkoxy group with 1–4 carbon atoms, a nitrile group, a COOR$_4$ group or a CONR$_5$R$_6$ group and
Ar represents the divalent aromatic radical 4,4'-diphenylene, 2,6-naphthylene or 4,4'-phenylene;
$R_4$ represents hydrogen or an alkyl group with 1–4 carbon atoms and
$R_5$ and $R_6$ represent, independently of each other, hydrogen, alkyl groups with 1 to 4 carbon atoms or aryl groups.

The polyamides preferably have recurrent structural units in which Ar is a 4,4'-phenylene radical.

The advantage of polyamides of the formulae indicated above compared with previously known aromatic polymers with a very high modulus of elasticity is that the products are readily soluble in polar organic solvents such as N-methyl pyrrolidone or dimethylacetamide without the aid of solubilizing agents and that filaments with very high tensile strengths and very high moduli of elasticity can be obtained from the products even at relatively low viscosities. A relative solution viscosity $\eta_{rel}$ determined at 25° C. in 0.5% N-methylpyrrolidone solution of 1.7 to 3.2 corresponds to an intrinsic viscosity of 1.1 to 2.3. The relatively low viscosity of the products enables them to be worked up from solutions which have a solids content of 15 to 20%. The quantity of solvent which it is necessary to deal with is therefore much lower than in the case of previously known aromatic polyamides with a high modulus of elasticity.

The polyamides according to the invention with a very high modulus of elasticity are prepared by reacting diamines of the General Formula II

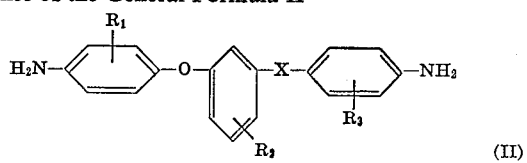

in which X, $R_1$, $R_2$ and $R_3$ have the meanings indicated above with aromatic dicarboxylic acid dihalides in polar organic solvents at tempertatures of between −30 and 150° C., preferably between −10 and +60° C.

The following compounds are given as examples of diamines which are suitable for the process according to the invention for producing aromatic polyamides:

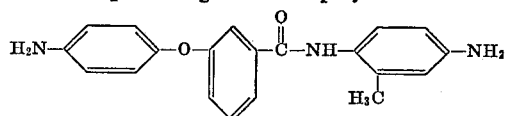

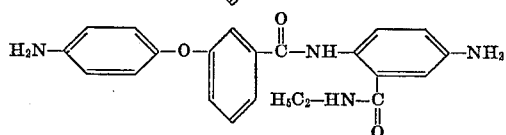

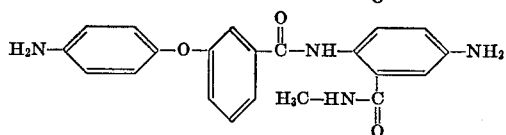

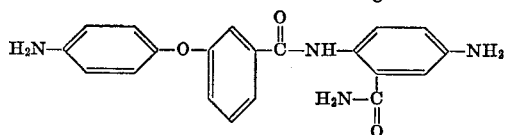

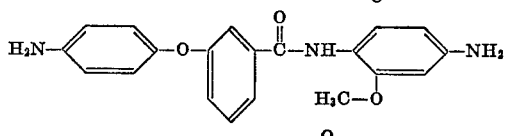

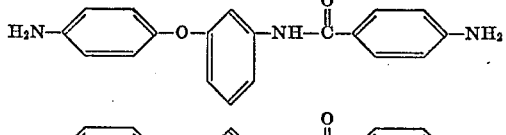

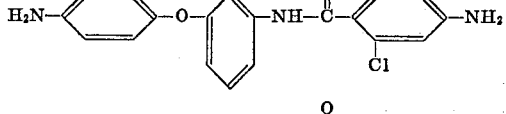

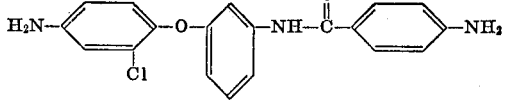

These diamines may be prepared by known processes which consist of reacting 3-(4'-nitrophenoxy)-benzoic acid chloride with the corresponding o-substituted 4-nitroanilines and reducing the resulting dinitro compounds or of reacting 3-amino-4'-nitrodiphenylethers or 3-amino-2'-chloro-4'-nitrodiphenylethers with 4-nitrobenzoyl chloride or 2-chloro-4-nitrobenzoyl chloride and subsequently reducing the dinitro compounds. These dinitro compounds can be obtained from 4-nitrophenoxybenzoic acid and the o-substituted 4-nitroanilines or from aminonitrodiphenylethers and 4-nitrobenzoic acids in N-methylpyrrolidone in the presence of $P_2O_5$.

The following compounds are examples of aromatic dicarboxylic acid dihalides which are suitable for the polycondensation: Diphenyl-4,4'-dicarboxylic acid dichloride, naphthalene-2,6-dicarboxylic acid dichloride and especially terephthalic acid dichloride and the corresponding acid bromides. When isophthalic acid dichloride is reacted with these diamines, on the other hand, only polyamides with low tensile strengths and low moduli of elasticity are obtained.

The polycondensation of diamines of the General Formula II with aromatic dicarboxylic acid dihalides is preferably carried out in polar organic solvents such as N,N-dialkyl-carboxylic acid amides, e.g. dimethylacetamide, or N-substituted lactams, e.g. N-methylpyrrolidone. The great advantage of these solvents is that they can be used without additional acid acceptors. In order to obtain the highest possible molecular weights, the diamines and the dicarboxylic acid dihalide should be used in equimolecular or almost equimolecular quantities. Polycondensation is carried out at temperatures of between −30 and +150° C., preferably between −10 and +60° C. The reaction times are between 1 and 30 hours and the solids content of the solutions is between 10 and 40%, preferably between 12 and 25%. The polyamides may either be spun directly from the polycondensation solutions, if necessary after first neutralizing the hydrochloric acid produced, e.g. with ethylene oxide, propylene oxide or amines, or they may first be precipitated from the polycondensation solution with precipitating agents such as water, alcohols or ketones, dried and redissolved in the given polar solvents or in dialkyl sulphoxides, for example dimethylsulphoxide, and then worked up into fibres or films. Apart from their high tensile strength and high modulus of elasticity, the fibres obtained from the polyamides according to the invention are also distinguished by their high thermal stability at elevated temperatures, for example 200 to 300° C.

Filaments and fibres produced from the polyamides according to this invention may be used as reinforcing materials for synthetic resins.

In the examples given below, parts by weight are related to parts by volume as kilograms to litres.

The following examples are to further illustrate the invention without limiting it.

EXAMPLE 1

(A) Preparation of the diamine used (a) 3-(p-nitrophenoxy)-2'-methyl-4'-nitrobenzanilide

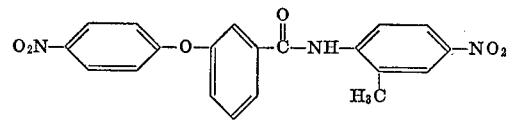

152 parts by weight of 2-methyl-4-nitroaniline were dissolved in 1200 parts by volume of N-methylpyrrolidone. 287 parts by weight of 3-(p-nitrophenoxy)-benzoic acid were then introduced at room temperature. After the addition of 164 parts by weight of $P_2O_5$, the reaction mixture was heated to 140° C. for 3 hours and suction filtered whilst hot, and 3-(p-nitrophenoxy)-2'-methyl-4'-nitrobenzanilide was precipitated from the filtrate with methanol. The product was suction filtered, boiled with methanol and dried. Yield: 347 parts by weight=88.5% of the theory. Melting point: 218–220° C.

The dinitro compound may also be obtained from 3-(p-nitrophenoxy)-benzoyl chloride by reacting this with 2-methyl-4-nitroaniline. Yield: 354 parts by weight= 98.8% of the theory. Melting point: 217–219° C.

(b) 3-(p - aminophenoxy)-2'-methyl-4'-aminobenzanilide

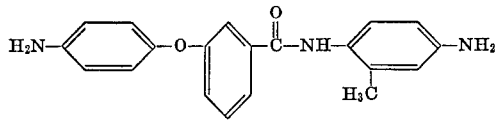

393 parts by weight of 3-(p-nitrophenoxy)-2'-methyl-4'-nitrobenzanilide in 1500 parts by volume of dimethylformamide were catalytically hydrogenated at 60 to 70° C. with hydrogen pressures of 60 excess atmospheres in the presence of 60 parts by weight of Raney nickel. When uptake of hydrogen had ceased, the product was suction filtered to remove Raney nickel and the filtrate was introduced into five times its volume of water. The precipitated 3-(p - aminophenoxy)-2'-methyl-4'-aminobenzanilide was suction filtered, washed thoroughly with water and thoroughly dried. Yield: 296 parts by weight=88.9% of the theory. Melting point: 179–181° C.

(B) Preparation of the polyamide 166.5 parts by weight of 3-(p-aminophenoxy)-2'-methyl-4'-aminobenzanilide were dissolved in 800 parts by weight of anhydrous N-methylpyrrolidone. 101.5 parts by weight of terephthalic acid dichloride divided into three substantially equal portions were added at room temperature. When the addition of terephthalic acid dichloride was completed, the reaction mixture was diluted with 270 parts by weight of N-methylpyrrolidone and then stirred for another 6 hours at room temperature. 58 parts by weight of propylene oxide were then added to neutralized the hydrochloric acid formed. The neutral solution had a viscosity of 1810 poises at 20° C. (the relative viscosity of the polymer, measured in a 0.5% solution in N-methylpyrrolidone of a sample of polyamide which had been precipitated with water and dried at 120° C. was 2.10, which corresponds to an intrinsic viscosity of 1.5). The polyamide solution obtained, which had a polyamide content of about 18.5%, was spun into a bath of water at 20° C. at a draw-off rate of 10 m./min. The filaments were then stretched in a ratio of 1:7.5 on a roller at temperatures of between 400 and 420° C. The filaments were found to have the following properties:

| | | |
|---|---|---|
| Titre | dtex | 3.0 |
| Tensile strength | g./dtex | 8.2 |
| Elongation on tearing | percent | 2 |
| Modulus of elasticity | kg./mm.² | 7600±400 |

The values obtained for the moduli of elasticity are average values taken from five measurements.

COMPARISON EXAMPLE 4-(p-aminophenoxy)-2'-methyl-4'-aminobenzanilide

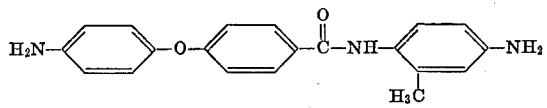

were prepared in a manner analogous to Examples 1(a) and 1(b) from 4-(p-nitrophenoxy)-benzoic acid and 2-methyl-4-nitroaniline. Melting point: 196–198° C.

In a manner analogous to Example 1(B), this diamine was reacted with terephthalic acid dichloride to produce a polyamide. The resulting solution was very highly viscous and had to be diluted to a solids content of 12%. Its viscosity was then 4380 poises. It was spun into water at room temperature as described in Example 1(B). The threads were stretched in the ratio of 1:5.3 at 400 to 430° C. They were found to have the following properties:

| | | |
|---|---|---|
| Titre | dtex | 3.3 |
| Tensile strength | g./dtex | 5.4 |
| Elongation on tearing | percent | 3 |
| Modulus of elasticity | kg./mm.² | 2900±100 |

The relative viscosity of the polymer, determined as in Example 1(B), was 3.95, which corresponds to an intrinsic viscosity of 2.6.

EXAMPLE 2

(A) Preparation of the diamine used (a) 4-nitro-3'-(p-nitrophenoxy)-benzanilide

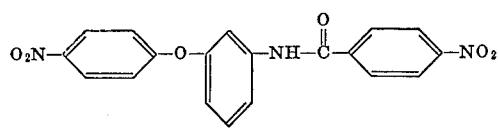

210 parts by weight of 3-amino-4'-nitro-diphenylether were dissolved in 1200 parts by volume of N-methylpyrrolidone. 185.5 parts by weight of 4-nitrobenzoyl chloride were then introduced at room temperature, the solution spontaneously heating up to about 60° C. Stirring was then continued for 3 hours at 60 to 70° C. and the reaction mixture was then stirred into 3000 parts by volume of methanol. The resulting precipitate was suction filtered, boiled with methanol and dried. Yield: 347 parts by weight=91.5% of the theory. Melting point: 181–183° C.

(b) 4-amino-3'-(p-aminophenoxy)-benzanilide

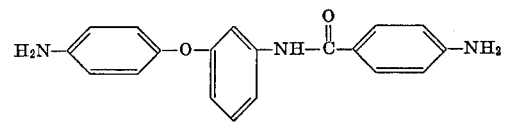

379 parts by weight of the dinitro compound prepared according to (a) were catalytically hydrogenated in 1200 parts by volume of N-methylpyrrolidone under the conditions described in Example 1(A)(b). When the uptake of hydrogen had ceased, the product was suction filtered while still hot to remove Raney nickel and the filtrate was cooled to 0° C. An addition compound of 4-amino-3'-(p-aminophenoxy)-benzanilide and N-methylpyrrolidone separated. It was suction filtered and dissolved in methanol with slight heating. The diamine was precipitated from the resulting solution by stirring the solution into water. The diamine was suction filtered and dried. Yield: 297 parts by weight=93% of the theory. Melting point: 143–145° C. (from water/methanol).

(B) Preparation of the polyamide 159.5 parts by weight of 4-amino-3'-(p-aminophenoxy)-benzanilide were reacted with 101.5 parts by weight of terephthalic acid dichloride in 800 parts by weight of anhydrous N-methylpyrrolidone in a manner analogous to Example 1(B). After dilution to a solids content of 16.5% and neutralization with propylene oxide, the polyamide solution obtained, which had a viscosity of 1975 poises at 20° C., was spun to filaments as described in Example 1(B). The filaments were stretched in the ratio of 1:6.0 at 410–420° C. The filaments were found to have the following properties:

| | | |
|---|---|---|
| Titre | dtex | 3.3 |
| Tensile strength | g./dtex | 7.2 |
| Elongation on tearing | percent | 2 |
| Modulus of elasticity | kg./mm.² | 9200±800 |

The relative viscosity of the polyamide, determined as in Example 1(b) was 2.03, which corresponds to an intrinsic viscosity of 1.43.

COMPARISON EXAMPLE 4-amino-4'-(p-aminophenoxy)-benzanilide

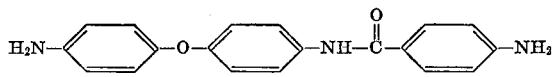

was prepared from 4-amino-4'-nitrodiphenylether and 4-nitrobenzoyl chloride in a manner analogous to Examples 2(A)(a) and 2(A)(b). Melting point: 180–183° C.

This diamine was reacted with terephthalic acid dichloride in a manner analogous to Example 2(B). The solution became very viscous and had to be diluted to a polyamide content of 12%. The viscosity of the solution was then 1725 poises at 20° C. This solution was then spun into filaments as described in Example 1(B) and the filaments were stretched in the ratio of 1:2.8 at 400 to 410° C. The filaments were found to have the following properties:

| | | |
|---|---|---|
| Titre | dtex | 5.5 |
| Tensile strength | g./dtex | 2.9 |
| Elongation | percent | 3.5 |
| Modulus of elasticity | kg./mm.² | 900±400 |

The relative viscosity of the polyamide could not be determined in N-methylpyrrolidone because the precipitated polyamide was no longer soluble in this solvent.

EXAMPLE 3

(A) Preparation of the diamine used 2-chloro-4-amino-3'-(p-aminophenoxy)-benzanilide

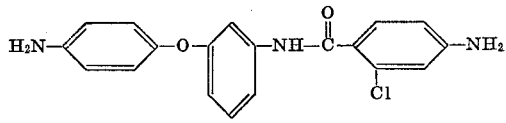

2-chloro-4-amino-3'-(p-aminophenoxy)-benzanilide was prepared from 3-amino-4'-nitro-diphenylether and 2-chloro-4-nitro-benzoyl chloride in a manner analogous to Examples 2(A)(a) and 2(A)(b). Melting point: 132–135° C.

(B) Preparation of the polyamide 176.75 parts by weight of 2-chloro-4-amino-3'-(p-aminophenoxy)-benzanilide were reacted with 101.5 parts by weight of terephthalic acid dichloride in a manner analogous to Example 1(B). After neutralization with propylene oxide and dilution to a polyamide content of 16.5%, the solution had a viscosity of 1240 poises at 20° C. This solution was then spun into filaments as described in Example 1(B). After the filaments had been stretched in the ratio of 1:6 at 420 to 440° C., they were found to have the following properties:

| | | |
|---|---|---|
| Titre | dtex | 4.2 |
| Tensile strength | g./dtex | 6.2 |
| Elongation on tearing | percent | 2 |
| Modulus of elasticity | kg./mm.² | 6600±800 |

The relative viscosity of the polyamide, measured as described in Example 1(B), is 1.89, which corresponds to an intrinsic viscosity of 1.28.

EXAMPLE 4

(A) Preparation of the diamine used (a) 3-(p-nitrophenoxy)-2'-ethylaminocarbonyl-4'-nitrobenzanilide

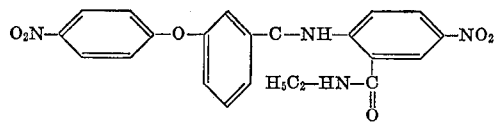

209 parts by weight of 5-nitroanthranilic acid-N-ethylamide were dissolved in 1500 parts by volume of N-methylpyrrolidone. 277.5 parts by weight of 3-(p-nitrophenoxy)-benzoyl chloride were introduced into this solution at room temperature. The solution was then stirred for 2 hours at 50° C., poured into methanol, suction filtered, boiled with methanol and dried. Yield: 388 parts by weight=86.3% of the theory. Melting point: 232–235° C.

(b) 3-(p-aminophenoxy)-2'-ethylaminocarbonyl-4'-aminobenzanilide

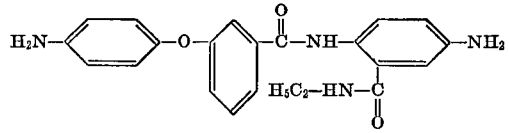

450 parts by weight of the dinitro compound prepared according to (a) were catalytically hydrogenated in a manner analogous to Example 1(A)(b) and worked up as described in that example. Yield: 357 parts by weight =91.5% of theory. Melting point: 182–183° C.

(B) Preparation of the polyamide 195 parts by weight of 3-(p-aminophenoxy)-2'-ethyleneaminocarbonyl-4'-amino-benzanilide were reacted with 101.5 parts by weight of terephthalic acid dichloride in 1200 parts by volume of anhydrous N,N-dimethylacetamide in a manner analogous to Example 1(B). The solution was neutralized with propylene oxide. The solids content of the solution, which had a viscosity of 2190 poises at 20° C., was 22%. The solution was spun into a precipitation bath of 70% of water and 30% of N,N-dimethylacetamide at 20° C. After being stretched in the ratio of 1:15 at 380–410° C., the filaments produced had the following properties:

| | | |
|---|---|---|
| Titre | dtex | 3.7 |
| Tensile strength | g./dtex | 9.2 |
| Elongation on tearing | percent | 2 |
| Modulus of elasticity | kg./mm.² | 4800±400 |

The polyamide had a relative viscosity, measured as in Example 1(B), of 2.05, which corresponds to an intrinsic viscosity of 1.42.

What we claim is:

1. High molecular weight aromatic polyamides with a relative solution viscosity $\eta_{rel}$, measured in a 0.5% solution in N-methylpyrrolidone at 25° C., of between 1.7 and 3.2, consisting essentially of repeating structural units of the general formula

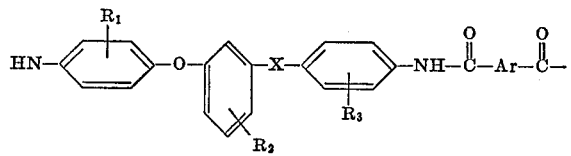

in which
X represents the group

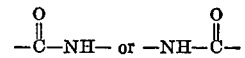

$R_1$ and $R_2$ represent, independently of each other, hydrogen, alkoxy or alkyl groups with 1 to 4 carbon atoms or halogen atoms, $R_3$ represents hydrogen, halogen, an alkyl or alkoxy group with 1 to 4 carbon atoms, a nitrile group or a $COOR_4$ or $CONR_5R_6$ group and Ar represents the divalent aromatic radical 4,4'-diphenylene, 2,6-naphthylene or 4,4'-phenylene;

$R_4$ represents hydrogen or an alkyl group with 1 to 4 carbon atoms, and $R_5$ and $R_6$ represent, independently of each other, hydrogen, alkyl groups with 1 to 4 carbon atoms or aryl groups.

2. High molecular weight aromatic polyamides according to claim 1 consisting essentially of repeating structural units of the general formula

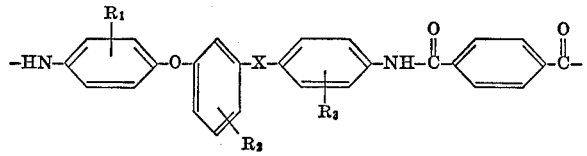

in which $R_1$, $R_2$, $R_3$ and X have the meanings indicated in claim 1.

3. Filaments of high molecular weight aromatic polyamides according to claim 1, with a tensile strength of over 4.5 g./dtex. and a modulus of elasticity of over 4000 kg./mm.$^2$.

References Cited

UNITED STATES PATENTS

| | | | |
|---|---|---|---|
| 3,199,434 | 7/1965 | Preston et al. | 260—47 |
| 3,505,288 | 4/1970 | Bodesheim et al. | 260—47 |
| 3,554,743 | 1/1971 | Mass | 96—1.5 |

LESTER L. LEE, Primary Examiner

U.S. Cl. X.R.

260—30.2, 30.8 R, 30.8 DS, 32.6 N, 78 R, 559 A; 264—178 F